United States Patent Office 3,226,401
Patented Dec. 28, 1965

3,226,401
ETHYLENICALLY UNSATURATED
MONOEPOXY COMPOUNDS
Samuel W. Tinsley, South Charleston, W. Va., assignor to Union Carbide Corporation, a corporation of New York
No Drawing. Filed May 14, 1962, Ser. No. 194,653
15 Claims. (Cl. 260—340.6)

This invention relates to the preparation of ethylenically unsaturated monoepoxy dioxanes. In one aspect, the invention relates to polymeric products of ethylenically unsaturated monoepoxy dioxanes. In other aspects, the invention relates to curable, polymerizable compositions comprising the aforementioned polymeric products, and to the cured resins resulting therefrom.

The novel ethylenically unsaturated monoepoxy dioxane monomers have the following formula:

(I)

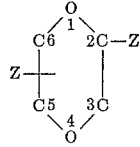

wherein the Z variables can be (a) a vic-epoxyalkoxy radical in which the vic-epoxy group is at least one carbon atom removed from the oxy (—O—) group of said radical, (b) a vic-epoxycycloalkoxy radical in which the vic-epoxy group is at least one carbon removed from the oxy (—O—) group of said radical, (c) a vic-epoxycycloalkyl-alkoxy radical, (d) a 3-oxatricyclo[3.2.1.0$^{2,4}$]oct-6-oxy radical, (e) a 3-oxatricyclo[3.2.1.0$^{2,4}$]oct-6-ylalkoxy radical, (f) a 4-oxatetracyclo[6.2.1.0$^{2,7}$.0$^{3,5}$]undec-9-oxy radical, (g) a 4-oxatetracyclo[6.2.1.0$^{2,7}$.0$^{3,5}$]undec-9-oxyalkoxy radical, (h) a 10-oxapentacyclo[6.3.1.1$^{3,6}$.0$^{2,7}$.0$^{9,11}$] tridec-4-oxy radical, (i) a 10-oxapentacyclo[6.3.1.1$^{3,6}$.0$^{2,7}$.0$^{9,11}$]tridec-4-oxyalkoxy radical, (j) a 10-oxapentacyclo[6.3.1.1$^{3,6}$.0$^{2,7}$.0$^{9,11}$]tridec-4-ylalkoxy radical, (k) an alkenyloxy radical in which the ethylenic group, i.e., >C=C<, is at least one carbon atom removed from the oxy (—O—) group of said radical, (l) a cycloalkenyloxy radical in which the ethylenic group is at least one carbon atom removed from the oxy group of said radical, (m) a cycloalkenylalkoxy radical, (n) a bicyclo[2.2.1]hep-2-en-5-oxy radical, (o) a tricyclo[5.2.1.0$^{2,6}$]dec-3-en-8-oxy radical, (p) a tricyclo[5.2.1.0$^{2,6}$]dec-3-en-8-oxyalkoxy radical, (q) a tetracyclo[6.2.1.1$^{3,6}$.0$^{2,7}$]dodec-9-en-4-oxy radical, (r) a tetracyclo[6.2.1.1$^{3,6}$.0$^{2,7}$]dodec-9-en-4-oxyalkoxy, and (s) a tetracyclo[6.2.1.1$^{3,6}$.0$^{2,7}$]dodec-9-en-4-ylalkoxy radical; with the provisos (1) that at one Z variable is one of the aforementioned ethylenic radicals and the remaining Z variable is one of the aforementioned vic-epoxy radicals, and (2) that the Z variables cannot be bonded to the carbon atom in the six position of the 1,4-dioxane nucleus.

It should be noted at this time that the expression "vic-epoxy," as used herein including the appended claims, refers to the group

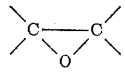

i.e., wherein the oxygen atom is bonded to vicinal carbon atoms. This term "vic-epoxy" is a recognized abbreviation for the expression "vicinal epoxy." The vic-epoxyalkoxy and alkenyloxy radicals preferably contain up to 18 carbon atoms. The cycloaliphatic nucleus of the vic-epoxycycloalkoxy, vic-epoxycycloalkylalkoxy, cycloalkenyloxy, and cycloalkenylalkoxy radicals preferaby contain from 5 to 7 carbon atoms including the epoxy carbon atoms. In addition, the expression "lower alkyl," as used herein including the appended claims, refers to a monovalent saturated aliphatic hydrocarbon radical which contains from 1 to 4 carbon atoms. Moreover, the "alkoxy" moiety (excluding the vic-epoxyalkoxy and alkenyloxy radicals) of the Z variables illustrated supra with reference to Formula I preferably contain up to 6 carbon atoms.

With reference to Formula I supra, illustrative Z variables include, for example, 2,3-epoxypropoxy,
2,3-epoxybutoxy,
2,3-epoxypentoxy,
2,3-epoxyhexoxy,
2,3-epoxyoctoxy,
4,5-epoxypentoxy,
3,4-epoxyheptoxy,
9,10-epoxyoctadecoxy,
2,3-epoxycyclopentoxy,
2,3-epoxycyclohexoxy,
2,3-epoxycycloheptoxy,
3,4-epoxycyclohexoxy,
lower alkyl-2,3-epoxycyclopentoxy,
lower alkyl-3,4-epoxycyclohexoxy,
lower alkyl-3,4-epoxycycloheptoxy,
2,3-epoxycyclopentylmethoxy,
2,3-epoxycyclohexylmethoxy,
3,4-epoxycyclohexylmethoxy,
3,4-epoxycycloheptylmethoxy,
3,4-epoxycyclohexylethoxy,
3,4-epoxycyclohexyl-n-propoxy,
lower alkyl-3,4-epoxycyclohexylmethoxy,
3-oxatricyclo[3.2.1.0$^{2,4}$]oct-6-oxy,
7-methyl-3-oxatricyclo[3.2.1.0$^{2,4}$]oct-6-oxy,
7-ethyl-3-oxatricyclo[3,2,1,0$^{2,4}$]oct-6-oxy,
3-oxatricyclo[3.2.1.0$^{2,4}$]oct-6-ylmethoxy,
4-oxatetracyclo[6.2.1.0$^{2,7}$.0$^{3,5}$]undec-9-oxy,
methyl-4-oxatetracyclo[6.2.1.0$^{2,7}$.0$^{3,5}$]undec-9-oxy,
4-oxatetracyclo[6.2.1.0$^{2,7}$.0$^{3,5}$]undec-9-oxyethoxy,
4-oxatetracyclo[6.2.1.0$^{2,7}$.0$^{3,5}$]undec-9-oxy-n-propoxy,
10-oxapentacyclo[6.3.1.1$^{3,6}$.0$^{2,7}$.0$^{9,11}$]tridec-4-oxy,
10-oxapentacyclo[6.3.1.1$^{3,6}$.0$^{2,7}$.0$^{9,11}$]tridec-4-oxyethoxy,
10-oxapentacyclo[6.3.1.1$^{3,6}$.0$^{2,7}$.0$^{9,11}$]tridec-4-oxyisopropoxy,
10-oxapentacyclo[6.3.1.1$^{3,6}$.0$^{2,7}$.0$^{9,11}$]tridec-4-oxy-n-butoxy,
10-oxapentacyclo[6.3.1.1$^{3,6}$.0$^{2,7}$.0$^{9,11}$]tridec-4-ylmethoxy,
10-oxapentacyclo[6.3.1.1$^{3,6}$.0$^{2,7}$.0$^{9,11}$]tridec-4-ylethoxy,
10-oxapentacyclo[6.3.1.1$^{3,6}$.0$^{2,7}$.0$^{9,11}$]tridec-4-yl-t-butoxy,
allyloxy,
2-butenyloxy,
2-hexenyloxy,
3-octenyloxy,
9-octadecenyloxy,
2-undecenyloxy,
2-cyclopentenyloxy,
3-cyclohexenyloxy,
3-cycloheptenyloxy,
2-cyclopentenylmethoxy,
2-cyclopentenylethoxy,
3-cyclohexenylmethoxy,
3-cyclohexenylethoxy,
3-cyclohexenyl-n-propoxy,
3-cycloheptenylmethoxy,
bicyclo[2.2.1]hept-2-en-5-oxy,
bicyclo[2.2.1]hept-2-en-5-ylmethoxy,
bicyclo[2.2.1]hept-2-en-5-ylethoxy,
bicyclo[2.2.1]hept-2-en-5-ylpropoxy,
tricyclo[5.2.1.0$^{2,6}$]dec-3-en-8-oxy,
tricyclo[5.2.1.0$^{2,6}$]dec-3-en-8-oxybutoxy,
tetracyclo[6.2.1.1$^{3,6}$.0$^{2,7}$]dodec-9-en-4-oxy,
tetracyclo[6.2.1.1$^{3,6}$.0$^{2,7}$]dodec-9-en-4-ylmethoxy,
tetracyclo[6.2.1.1$^{3,6}$.0$^{2,7}$]dodec-9-en-4-oxyethoxy, tetracyclo[6.2.1.1$^{3,6}$.0$^{2,7}$]dodec-9-en-4-oxy-n-propoxy,
tetracyclo[6.2.1.1$^{3,6}$.0$^{2,7}$]dodec-9-en-4-ylmethoxy,
tetracyclo[6.2.1.1$^{3,6}$.0$^{2,7}$]dodec-9-en-4-yletoxy,
tetracyclo[6.2.1.1$^{3,6}$.0$^{2,7}$]dodec-9-en-4-ylbutoxy,
and the like.

Illustrative subclasses of novel ethylenically unsaturated monoepoxy dioxanes include, for instance, 2-alkenyloxy-3-vic-epoxyalkoxy-1,4-dioxane,
2-cycloalkenyloxy-3-vicepoxycycloalkoxy-1,4-dioxane,
2-cycloalkenylalkoxy-3-vic-epoxycycloalkylalkoxy-1,4-dioxane,
2-(bicyclo[2.2.1]hept-2-en-5-oxy)-3-(3-oxatricyclo [3.2.1.0$^{2,4}$]oct-6-oxy)1,4-dioxane,
2-(bicyclo[2.2.1]hept-2-en-5-ylalkoxy)-3-(3-oxatricyclo [3.2.1.0$^{2,4}$]oct-6-ylalkoxy)-1,4-dioxane,
2-(tricyclo[5.2.1.0$^{2,6}$]dec-3-en-8-oxy)-3-(4-oxatetracyclo[6.2.1.0$^{2,7}$.0$^{3,5}$]undec-9-oxy)-1,4-dioxane,
2-(tricyclo[5.2.1.0$^{2,6}$]dec-3-en-8-oxyalkoxy)-3-(4-oxatetracyclo[6.2.1.0$^{2,6}$]undec-9-oxyalkoxy)-1,4-dioxane,
2-(tetracyclo[6.2.1.1$^{3,6}$.0$^{2,7}$]dodec-9-en-4-oxy)-3-(10-oxapentacyclo[6.3.1.1$^{3,6}$.0$^{2,7}$.0$^{9,11}$]tridec-4-oxy)-1,4-dioxane,
2-(tetracyclo[6.2.1.1$^{3,6}$.0$^{2,7}$]dodec-9-en-4-oxyalkoxy)-3-(10-oxapentacyclo[6.3.1.1$^{3,6}$.0$^{2,7}$.0$^{9,11}$]tridec-4-oxyalkoxy)-1,4-dioxane,
2-(tetracyclo[6.2.1.1$^{3,6}$.0$^{2,7}$]dodec-9-en-4-ylalkoxy)-3-(10-oxapentacyclo[6.3.1.1$^{3,6}$.0$^{2,7}$.0$^{9,11}$]tridec-4-ylalkoxy)-1,4-dioxane, and the like. It is to be understood, however, that the radical monovalently bonded to the C$_2$ (carbon) atom of the dioxane nucleus can contain an ethylenic group in which case the radical monovalently bonded to the C$_3$ or C$_5$ atom of the dioxane nucleus contains a vic-epoxy group. Alternatively, the radical monovalently bonded to the C$_2$ atom of the dioxane nucleus can contain a vic-epoxy group in which case the radical monovalently bonded to the C$_3$ or C$_5$ atom of the dioxane nucleus contains an ethylenic group.

Specific examples of novel ethylenically unsaturated monoepoxy dioxanes includes, by way of illustration, 2-allyloxy-3-(2,3-epoxypropoxy)-1,4-dioxane,
2-(2-butenyloxy)-3-(2,3-epoxybutoxy)-1,4-dioxane,
2-(9-octadecenyloxy)-3-(9,10-epoxyoctadecoxy)-1,4-dioxane,
2-(2-cyclopentenyloxy)-3-(2,3-epoxycyclopentoxy)-1,4-dioxane,
2-(3-cyclohexenyloxy)-3-(3,4-epoxycyclohexoxy)1,4-dioxane,
2-(3-cycloheptenyloxy)-3-(3,4-epoxycycloheptoxy)-1,4-dioxane,
2-(3-cyclohexenylmethoxy)-3-(3,4-epoxycyclohexylmethoxy)-1-4-dioxane,
2-(bicyclo[2.2.1]hept-2-en-5-oxy)-3-(3-oxatricyclo [3.2.1.0$^{2,4}$]oct-6-oxy)-1,4-dioxane,
2-(bicyclo[2.2.1]hept-2-en-5-ylmethoxy)-3-(3-oxatricyclo [3.2.1.0$^{2,4}$]oct-6-ylmethoxy)-1,4-dioxane,
2-(tricyclo[5.2.1.0$^{2,6}$]dec-3-en-8-oxy)-3-(4-oxatetracyclo [6.2.1.0$^{2,7}$.0$^{3,5}$]undec-9-oxy)-1,4-dioxane,
2-(tricyclo[5.2.1.0$^{2,6}$]dec-3-en-8-oxyethoxy)-3-(4-oxatetracyclo[6.2.1.0$^{2,6}$]undec-9-oxyethoxy)-1,4-dioxane,
2-(tetracyclo[6.2.1.1$^{3,6}$.0$^{2,7}$]dodec-9-en-4-oxy)-3-(10-oxapentacyclo[6.3.1.1$^{3,6}$.0$^{2,7}$.0$^{9,11}$]tridec-4-oxy)-1,4-dioxane,
2-(tetracyclo[6.2.1.1$^{3,6}$.0$^{2,7}$]dodec-9-en-4-ylmethoxy)-3-(10-oxapentacyclo[6.3.1.1$^{3,6}$.0$^{2,7}$.0$^{9,11}$]tridec-4-ylmethoxy)-1,4-dioxane.

Though the above illustrative ethylenically unsaturated monoepoxy dioxanes contain substituents on the C$_2$ and C$_3$ atoms of the 1,4-dioxane nucleus, it is to be understood that the instant invention also contemplates the 2,5-disubstituted 1,4-dioxanes. Moreover, the substituent which is bonded to the C$_2$ atom of the dioxane nucleus can contain an ethylenic group; consequently, the substituent which is bonded to the C$_3$ or C$_5$ atom of the dioxane nucleus must contain a vic-epoxy group. On the other hand, if the substituent bonded to the C$_2$ atom of the dioxane nucleus contains a vic-epoxy group, then the substituent which is bonded to the C$_3$ or C$_5$ atom contains an ethylenic group.

The novel ethylenically unsaturated monoepoxy dioxanes can be prepared by the reaction of the corresponding diolefinic diether dioxane precursor, e.g., bis(alkenyloxy)-1,4-dioxane,
bis(cycloalkenyloxy)1,4-dioxane,
bis(cycloalkenylalkoxy)-1,4-dioxane,
bis(bicyclo[2.2.1]hept-2-en-5-oxy)-1,4-dioxane,
bis(bicyclo[2.2.1]hept-2-en-5-ylalkoxy)-1,4-dioxane,
bis(tricyclo[5.2.1.0$^{2,6}$]dec-3-en-8-oxy)-1,4-dioxane,
bis(tricyclo[5.2.1.0$^{2,6}$]dec-3-en-8-oxyalkoxy)-1,4-dioxane,
bis(tetracyclo[6.2.1.1$^{3,6}$.0$^{2,7}$]dodec-9-en-4-oxy)-1,4-dioxane,
bis(tetracyclo[6.2.1.1$^{3,6}$.0$^{2,7}$]dodec-9-en-4-oxyalkoxy)-1,4-dioxane, and
bis(tetracyclo[6.2.1.1$^{3,6}$.0$^{2,7}$]dodec-9-en-4-ylalkoxy)-1,4-dioxane, with an organic peracid. Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracid, based on the total weight of peracid and inert organic vehicle is suitable; from about 20 to 40 weight percent of the peracid is preferred. The epoxidation reaction can be conducted at a temperature in the range of from about 0° C., and lower, to about 100° C., and higher, and preferably from about 20° C to about 80° C. Substantial conversion of diolefinic diether dioxane precursor to ethylenically unsaturated monoepoxy dioxane is favored or accomplished by employing at least one mol of said precursor per mol of peracid, e.g., from about 1.0 to about 10, and higher, mols of precursor per mol of peracid. However, a slight molar excess of peracid to precursor can be used, but with the attendant disadvantage of correspondingly diminished yields of ethylenically unsaturated monoepoxy dioxane. In general, the epoxidation reaction is conducted for a period of time which is sufficient to essentially consume the quantity of peracid employed. Periodic analysis of samples of the reaction mixture to determine the quantity of peracid consumed during the epoxidation reaction can be readily performed by the operator by well-known techniques. At the termination of the epoxidation reaction, the unreacted diolefinic diether dioxane precursor acid by-product, inert vehicle, if employed, and the like, can be recovered from the reaction product mixture, for example, by distillation under reduced pressure. Further well-known procedures such as fractional distillation, and the like, can be used to separate the ethylenically unsaturated monoepoxy dioxane from any epoxide by-product.

The diolefinic diether dioxane precursor can be prepared by the reaction of 2,3-dichlorodioxane or 2,5-dichlorodioxane with the appropriate monoethylenically unsaturated alcohol or mixtures thereof, e.g., alkenol,
cycloalkenol,
cycloalkenylalkanol,
bicyclo[2.2.1]hept-2-en-5-ol,
bicyclo[2.2.1]hept-2-en-5-ylalkanol,
tricyclo[5.2.1.0$^{2,6}$]dec-3-en-8-ol, tricyclo[5.2.1.0²,⁶]dec-3-en-8-oxyalkanol,
tetracyclo[6.2.1.1³,⁶.0²,⁷]dodec-9-en-4-ol,
tetracyclo[6.2.1.1³,⁶.0²,⁷]dodec-9-en-4-oxyalkanol, and
tetracyclo[6.2.1.1³,⁶.0²,⁷]dodec-9-en-4-ylalkanol, preferably in a molar ratio of one mol of dichlorodioxane to at least two mols of monoethylenically unsaturated alcohol. This reaction readily proceeds at room temperature, e.g., about 24° C., and the gaseous hydrogen chloride by-product can be continuously removed during the reaction. The desired diolefinic diether dioxane precursor can be recovered from the resulting reaction product mixture via conventional techniques such as distillation, fractionation, crystallization, and the like.

The 2,3-dichlorodioxane reagent can be prepared by reaction of dioxane and chlorine gas, at elevated temperatures, e.g., about 70° to 100° C., in the absence or presence of a catalyst, e.g., stannous chloride. Thereafter, nitrogen gas can be bubbled through the resulting reaction product mixture to remove any unreacted chlorine, if desired. Unreacted dioxane can be removed from said reaction product mixture by conventional means, e.g., distillation under reduced pressure, thus giving 2,3-dichlorodioxane.

The 2,5-dichlorodioxane reagent can be prepared by the reaction of dioxane and chlorine gas, at relatively low temperatures, e.g., about −30° C. to about 0° C., generally in the presence of an inert normally liquid organic vehicle, e.g., carbon tetrachloride. The resulting reaction product mixture then can be cooled in a Dry Ice bath which causes 2,5-dichlorodioxane to crystallize from said reaction product mixture. The 2,5-dichlorodioxane is readily recovered therefrom via well-known techniques, e.g., crystallization.

The preparation of the alkenols, cycloalkenols, and cycloalkenylalkanols are documented in the literature.

The preparation of bicyclo[2.2.1]hept-2-en-5-ol is effected by the reaction of cyclopentadiene and vinyl acetate, at an elevated temperature, e.g., about 180° C., for a period of several hours, e.g., about 3 hours, to produce 5-acetoxy-bicyclo[2.2.1]hept-2-ene. This bicyclo product then is reacted with potassium hydroxide, under refluxing conditions, to give bicyclo[2.2.1]hept-2-en-5-ol.

The preparation of bicyclo[2.2.1]hept-2-en-5-ylalkanol is accomplished by the reaction of cyclopentadiene with an alkenol, e.g., allyl alcohol, crotyl alcohol, 2-hexenol, and the like, at an elevated temperature, e.g., about 180° C., and for a period of time sufficient to produce bicyclo-[2.2.1]hept-2-en-5-ylalkanol.

The preparation of tricyclo[5.2.1.0²,⁶]dec-3-en-8-ol is effected by the reaction of dicyclopentadiene with an aqueous solution of an inorganic acidic catalyst, e.g., an aqueous solution of 25 weight percent sulfuric acid, at an elevated temperature, e.g., from about 75° C. and lower, to about 125° C., and higher, and for a period of time sufficient to produce tricyclo[5.2.1.0²,⁶]dec-3-en-8-ol as the product.

The preparation of tricyclo[5.2.1.0²,⁶]dec-3-en-8-oxyalkanol or tetracyclo[6.2.1.1³,⁶.0²,⁷]dodec-9-en-4-oxyalkanol is accomplished, for example, by reacting a molar excess of a dihydric alcohol, e.g., ethylene glycol, the propanediols, the butanediols, and the like, with dicyclopentadiene or tetracyclo[6.2.1.1³,⁶.0²,⁷]dodeca-4,9-diene (which latter diene is prepared by reacting cyclopentadiene with acetylene for about 1 hour at 180° C. to give bicyclo[2.2.1]hepta-2,5-diene which in turn reacts with cyclopentadiene under the same conditions to yield tetra-[6.2.1.1³,⁶.0²,⁷]dodeca - 4,9 - diene), in the presence of boron trifluoride catalyst, at an elevated temperature, e.g., from about 50° C., and lower, to about 125° C., and higher, and for a period of time to produce tricyclo[5.2.1.0²,⁶]dec-3-en-8 - oxyalkanol and tetracyclo-[6.2.1.1³,⁶.0²,⁷]dodec-9-en-4-oxyalkanol as the product.

The preparation of tetracyclo[6.2.1.1³,⁶.0²,⁷]dodec-9-en-4-ol is as follows. The Diels-Alder reaction of equimolar quantities of cyclopentadiene and vinyl acetate results in 5-acetoxy-bicyclo[2.2.1]hept-2-ene. Subsequent reaction of the bicyclo product with cyclopentadiene yields 4-acetoxy-tetracyclo[6.2.1.1³,⁶.0²,⁷]dodec-9-ene. The reaction of the tetracyclo product with potassium hydroxide yields tetracyclo[6.2.1.1³,⁶.0²,⁷]dodec-9-en-4-ol. The reaction conditions are similar to those set forth in the preparation of bicyclo[2.2.1]hept-2-en-5-ol.

The preparation of tetracyclo[6.2.1.1³,⁶.0²,⁷]dodec-9-en-4-ylalkanol, also, can be prepared via the Diels-Alder synthesis route. For instance, the reaction of at least two mols of cyclopentadiene with one mol of alkenol will yield tetracyclo[6.2.1.1³,⁶.0²,⁷]dodec-9-en-4-ylalkanol. The reaction conditions have been discussed supra in connection with bicyclo[2.2.1]hept-2-en-5-oxyalkanol.

The novel monomers of the invention are characterized by the presence of one vicinal epoxy group,

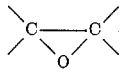

and one ethylenic group, >C═C<, in the molecule. The presence of these two functional groups in the molecule makes them highly useful in a wide variety of chemical reactions whereby novel, useful products are obtained. For example, the novel monomer can be homopolymerized through the ethylenic group, or the novel monomer can be copolymerized with other ethylenically unsaturated organic compound(s) (described hereinafter and termed "vinyl monomer," for brevity) through their ethylenic groups, preferably in the presence of a peroxide catalyst (described hereinafter), to give soluble, fusible, essentially linear polymeric products which contain a plurality of free or pendant vicinal epoxy groups. These polymeric products which contain a plurality of free vicinal epoxy groups then can be admixed with an active organic hardener (described hereinafter) and/or an acidic or basic catalyst (described hereinafter) to give curable, polymerizable compositions which can be partially cured or fully cured to infusible, thermoset, cross-linked resinous products. By way of a second illustration, the novel monomer can be homopolymerized through the vicinal epoxy group, or the novel monomer can be copolymerized with other polyepoxides (described hereinafter) through the vicinal epoxy groups, preferably in the presence of an acidic or basic catalyst, to give polymeric products which contain a plurality of free or pendant ethylenic groups These polymeric products which contain a plurality of free ethylenic groups then can be admixed with a vinyl monomer and/or peroxide catalyst and polymerized through the ethylenic groups to give infusible, cross-linked resinous products.

Accordingly, one embodiment of the invention is directed to the homopolymerization of the novel monomers in the presence of a peroxide catalyst, said homopolymerization being effected through the ethylenic group of said novel monomers whereby novel homopolymeric products which contain a plurality of free vicinal epoxy groups are obtained. The homopolymerization reaction can be conducted at a temperature in the range of from about 0° C., and lower, to about 150° C., and higher, and for a period of time sufficient to yield novel soluble, fusible, essentially linear homopolymeric products (containing free vicinal epoxy groups).

A second embodiment of the invention is directed to the polymerization of the novel homopolymeric products (of the first embodiment) in the presence of an acidic or basic catalyst, said polymerization being effected through the vicinal epoxy groups, to give novel insoluble, infusible, cross-linked resinous products. The polymerization reaction can be conducted at a temperature range of from about 10° C. to about 250° C., and higher, and for a period of time ranging from several minutes to several hours.

A third embodiment of the invention is directed to the copolymerization of the novel homopolymeric products (of the first embodiment) with polyepoxides, preferably in the presence of an acidic or basic catalyst, said copolymerization being effected through the vicinal groups, to give novel insoluble, infusible, cross-linked resinous products. The polymerization reaction can be conducted at a temperature range of from about 10° C. to about 250° C., and higher, and for a period of time ranging from several minutes to several hours.

A fourth embodiment of the invention is directed to the polymerization of the novel homopolymeric products (of the first embodiment) with an active organic hardener, with or without an acidic or basic catalyst, to give novel partially cured, fusible, thermosetting, intermediate reaction products, or novel fully cured, insoluble, infusible, thermoset, cross-linked resinous products. This reaction can be conducted at a temperature in the range of from about 10° C. to about 250° C. The reaction time will depend, of course, on the degree of cure desired and other considerations well-known to the epoxy artisan.

A fifth embodiment of the invention is directed to the homopolymerization of the novel monomers in the presence of an acidic or basic catalyst, said homopolymerization being effected through the vicinal epoxy group of said novel monomers whereby novel homopolymeric products which contain a plurality of free ethylenic groups are obtained. This homopolymerization reaction can be conducted at a temperature in the range of from about 10° C. to about 250° C., and higher, and for a period of time sufficient to yield novel soluble, fusible, essentially linear homopolymeric products (containing free ethylenic groups).

A sixth embodiment of the invention is directed to the polymerization of the novel homopolymeric products (of the fifth embodiment) in the presence of a peroxide catalyst, said homopolymerization being effected through the ethylenic groups, to give novel insoluble, cross-linked resinous products. A reaction temperature in the range of from about 0° C., and lower to about 150° C., and higher, is suitable. The reaction time can be varied from several minutes to several hours.

A seventh embodiment of the invention is directed to the copolymerization of the novel homopolymeric products (of the fifth embodiment) with a vinyl monomer, in the presence of a peroxide catalyst, said copolymerization being effected through the ethylenic groups, to give novel insoluble, cross-linked resinous products. A reaction temperature in the range of from about 0° C., and lower, to about 150° C., and higher, is suitable. The reaction time can be varied from several minutes to several hours.

The invention also contemplates other embodiments such as the copolymerization of the novel monomers with a vinyl monomer, preferably in the presence of a peroxide catalyst, to give copolymeric products which contain a plurality of free vicinal epoxy groups. The copolymeric products then can be reacted with an acidic or basic catalyst, or a polyepoxide, or an active organic hardener, whereby useful insoluble, infusible, cross-linked resinous products are obtained. The operative conditions of these reactions are similar to those discussed in the seven embodiments supra.

The acidic and basic catalysts which can be employed in the appropriate embodiments discussed supra include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoridedimethyl ether complex, boron trifluoride-diethyl ether complex, boron trifluoride-dipropyl ether complex and the like; the mineral acids, e.g., phosphoric acid, polyphosphoric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like; the stannous acylates, e.g., stannous acetate, stannous butyrate, stannous hexanoate, stannous octanoate, stannous benzoate, and the like; the stannic alkoxides, e.g., stannic butoxide, stannic 2-ethylhexoxide, and the like; the alkali metal hydroxides, e.g., sodium hydroxide, potassium hydroxide, and the like; the tertiary amines, e.g., trimethylamine, triethylamine, and the like. The boron trifluoride-amine complexes are highly preferred. The acidic or basic catalysts can be employed in amounts ranging from about 0.001 to about 10, and higher, weight percent, based on the total weight of epoxide component(s). It is pointed out that by the term "vicinal epoxy polymerization catalyst," as used herein including the appended claims, is meant those catalysts, such as illustrated above, which effect the homopolymerization of copolymerization of the epoxide component(s) through the vicinal epoxy groups.

The peroxide catalysts which can be employed in the apropos embodiments discussed supra include, for instance, benzoyl peroxide, methyl ethyl ketone peroxide, methyl isobutyl ketone peroxide, p-menthane hydroperoxide, t-butyl hydroperoxide, cumene hydroperoxide, acetyl peroxide, cyclohexanone peroxide, lauroyl peroxide, di-t-butyl peroxide, t-butyl perbenzoate, and the like. The concentration of the peroxide catalyst can range from about 0.01, and lower, to about 5.0, and higher, weight percent, based on the total weight of ethylenic component(s).

Representative polypoxides which can be employed (in the third embodiment supra) include, among others, 4-vinylcyclohexene dioxide, dicyclopentadiene dioxide, divinylbenzene dioxide, 3,4-epoxy - 6 - methylcyclohexylmethyl, 3,4-epoxy - 6 - methylcyclohexanecarboxylate, diethylene glycol bis(3,4 - epoxycyclohexanecarboxylate), bis(2,3-epoxycyclopentyl) ether, bis(3,4-epoxycyclohexylmethyl) pimelate, 1,1,1 - trimethylolpropane tris(3,4-epoxycyclohexanecarboxylate), the polyglycidyl polyethers of polyhydric phenols, and the like.

Among the ethylenically unsaturated compounds which are contemplated are those which contain a polymerizable ethylenic bond. Illustrative ethylenically unsaturated compounds include, for example, styrene, alkylstyrene, chlorostyrene, ethylstyrene, dimethylstyrene, isopropylstyrene, divinylbenzene, alkyl acrylate, alkyl methacrylate, alkyl crotonate, methyl acrylate, ethyl acrylate, n-propyl acrylate, n-butyl acrylate, methyl methacrylate, ethyl methacrylate, isopropyl methacrylate, n-amyl methacrylate, methyl crotonate, ethyl crotonate, n-propyl crotonate, t-butyl crotonate, 2-ethylhexyl crotonate, vinyl acetate, vinyl propionate, vinyl butyrate, vinyl valerate, and the like. Additional desirable monomeric ethylenically unsaturated compounds include, for instance, triallyl cyanuarate, diallyl phthalate, triallylamine, acrylonitrile, allyl acrylate, allyl methacrylate, ally crotonate, allyl butyrate, allyl 2-ethylhexanoate, allyl benzoate, and the like.

The active organic hardeners which can be employed in the fourth embodiment supra include polycarboxylic acids, polycarboxylic acid anhydrides, polyfunctional amines, polyols, polythiols, polyisocyanates, polyacyl halides, and the like. The active organic hardeners illustrated hereinafter can be employed in a curing amount, that is, an amount which is sufficient to cause the curable system comprising the novel epoxide component(s) to become a thermosetting or thermoset copolymeric resin in accordance with the teachings of the instant specification.

Representative polycarboxylic acids which are contemplated include, for instance, oxalic acid, succinic acid, glutaric acid, adipic acid, suberic acid, alkylsuccinic acids, alkenylsuccinic acids, maleic acid, itaconic acid, allylmalonic acid, 3-hexynedioic acid, 1,2-cyclohexanedicarboxylic acid, phthalic acid, terephthalic acid, and the like. It is desirable to employ the polycarboxylic acid and epoxide component in such relative amounts so as to provide from about 0.1 to about 2.0 carboxy groups, i.e., —COOH groups, of said acid per epoxy group, i.e.,

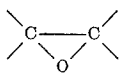

group, of said epoxide component.

Illustrative polycarboxylic acid anhydrides include, for example, phthalic anhydride, tetrahydrophthalic anhydride, maleic anhydride, glutaric anhydride, succinic anhydride, nonenylsuccinic anhydride, 1,8-naphthalic anhydride, lower alkyl substituted-bicyclo[2,2,1]hept-5-ene-2,3-dicarboxylic anhydride, methylbicyclo[2,2,1]hept-2-ene-2,3-dicarboxylic anhydride, and the like. The polycarboxylic acid anhydride and epoxide component are employed in such relative amounts so as to provide from about 0.1 to about 4.0 carboxy groups of said anhydride per epoxy group of said epoxide component. It should be noted that by the expression "carboxy groups of said anhydride" is meant the carboxy groups which would be contained by the corresponding polycarboxylic acid. For example, succinic anhydride does not possess any carboxy groups per se; however, the corresponding polycarboxylic acid is succinic acid which contains two free carboxy groups. Thus, succinic anhydride contains two carboxy groups as applied in the above expression. In different language, by the expression "carboxy groups of said anhydride" is meant the carboxy groups contained in the "hydrated" polycarboxylic acid anhydride.

Representative polyols include, by way of example, ethylene glycol, diethylene glycol, the polyethylene glycols, propylene glycol, the polypropylene glycols, 1,1,1-trimethylolpropane, the polyvinyl alcohols, the cyclopentanediols, the cyclohexanediols, resorcinol, catechol, bis(4-hydroxyphenyl)-2,2-propane, 1,8-naphthalenediol, and the like. It is pointed out that the term "polyol," as used herein, includes those organic compounds which have at least two hydroxy (—OH) groups and they can be alcoholic hydroxy groups, phenolic hydroxy groups, or both alcoholic and phenolic hydroxy groups. The term "polyol" preferably encompasses the polyhydric alcohols and the polyhydric phenols. In general, the proportions of polyol and epoxide component are such so as to provide from about 0.1 to about 2.0 hydroxy groups of said polyol per epoxy group of said epoxide component.

Among the polyfunctional amines contemplated include the aliphatic amines, the aromatic amines, the aralkyl amines, the cycloaliphatic amines, the alkaryl amines, the aliphatic polyamines which include the polyalkylene polyamines, the amino-substituted monohydric aliphatic alcohols and phenols, the addition products of polyamines and low molecular weight epoxides containing oxirane oxygen linked to vicinal carbon atoms, and others. By the term "polyfunctional amine," as used herein, is meant an organic amine having at least two active amino hydrogen atoms which can be on the same nitrogen atom or on different nitrogen atoms. The relative proportions of polyfunctional amine and epoxide component provide from about 0.2 to about 5.0 amino hydrogen atoms of said amine per epoxy group of said epoxide component.

The novel, curable, polymerizable compositions comprising an epoxide component(s) can be readily handled in resin-forming operations such as coating, laminating, bonding, molding, casting, potting, encapsulating, and the like. These polymerizable compositions are capable of accepting solid materials, such as fillers and pigments, for providing various effects in physical properties and coloration. With or without such added solid materials, these polymerizable compositions can be made to fill small intricacies of molds without the necessity of applying high pressures or heating to high temperatures, although such measures can be employed, if desired. These polymerizable compositions can be cured in molds which have intricate surfaces, and the resulting molded resin exhibits exact and fine details of the mold. These polymerizable compositions, also, can be advantageously employed in the potting of fragile articles such as electronic components.

The novel polymerizable compositions comprising an ethylenic component(s) readily yield novel polymeric products (as illustrated previously) which products have utility as hydraulic fluids, lubricating oils, molding compositions, cable insulation, and the like. In addition, these novel polymeric products have a variety of uses in the rubber art as is readily apparent to the artisan skilled in this art.

The following examples are illustrative.

*Example 1*

To a reaction vessel which contains 2,3-bis(3-cyclohexenyloxy)1,4-dioxane (0.500 mole) maintained about 40° C. with stirring, there is added, dropwise, 142 grams of 25 weight per cent solution of peracetic acid in ethyl acetate over a period of 2 hours. After an additional 2 hours at about 50° C., the reaction is essentially complete as indicated by titration for peracetic acid. The volatile materials, i.e., ethyl acetate, acetic acid by-product, etc., are removed from the reaction product mixture by co-distillation with ethylbenzene. The viscous liquid product, thus obtained, is identified as 2-(3-cyclohexenyloxy)-3-(3,4-epoxycyclohexyloxy)-1,4-dioxane by inspection of its infrared absorption spectrum and by analysis for oxirane oxygen.

*Example 2*

To a reaction vessel which contains 2,5-bis(6-methyl-2-cyclohexenylmethoxy)-1,4-dioxane (0.500 mole) maintained about 40° C. with stirring, there is added, dropwise, 142 grams of a 25 weight percent solution of peracetic acid in ethyl acetate over a period of 2 hours. After an additional 2 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2-(6-methyl - 3 - cyclohexenylmethoxy)-5-(3,4-epoxy-6-methylcyclohexylmethoxy)-1,4-dioxane by inspection of its infrared absorption spectrum and by analysis for oxirane oxygen.

*Example 3*

To a reaction vessel which contains 2,3-bis(tricyclo-[5.2.1.0$^{2,6}$]dec-3-en-8-yloxy)-1,4-dioxane (0.500 mole) maintained about 40° C. with stirring, there is added, dropwise, 142 grams of a 25 weight percent solution of peracetic acid in ethyl acetate over a period of 2 hours. After an additional 2 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2-(bicyclo [2.2.1]hept - 5 - en-2-yloxy)-3-(3-oxatricyclo cyclo[6.2.1.0$^{2,7}$.0$^{3,5}$]undec-9-yloxy)-1,4-dioxane by inspection of its infrared absorption spectrum and by analysis for oxirane oxygen.

*Example 4*

To a reaction vessel which contains 2,3-bis(bicyclo [2.2.1]hept-5-en - 2 - yloxy)-1,4-dioxane (0.500 mole) maintained about 40° C. with stirring, there is added, dropwise, 142 grams of a 25 weight percent solution of peractic acid in ethyl acetate over a period of 2 hours. After an additional 2 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2-(bicyclo 2.2.1]hept - 5 - en-2-yloxy)-3-(3-oxatricyclo

[3.2.1.0$^{2,4}$]oct-6-yloxy)-1,4-dioxane by inspection of its infrared absorption spectrum and by analysis for oxirane oxygen.

*Example 5*

To a reaction vessel which contains 2,3-bis(bicyclo [2.2.1]hept-5-en-2-ylmethoxy)-1,4-dioxane (0.500 mole) maintained about 40° C. with stirring, there is added, dropwise, 142 grams of a 25 weight percent solution of peracetic acid in ethyl acetate over a perod of 2 hours. After an additional 2 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2-(bicyclo[2.2.1]hept-5 - en - 2-ylmethoxy)-3-(3-oxatricyclo[3.2.1.$^{2,4}$]oct-6-ylmethoxy)-1,4-dioxane by inspection of its infrared absorption spectrum and by analysis for oxirane oxygen.

*Example 6*

To a reaction vessel which contains 2,5-bis(tricyclo [5.2.1.0$^{2,6}$]dec-3-en-8-yloxy)ethoxy-1,4 - dioxane (0.500 mole) maintained about 40° C. with stirring, there is added, dropwise, 142 grams of a 25 weight percent solution of peracetic acid in ethyl acetate over a period of 2 hours. After an additional 2 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2-(2-(tricyclo[5.2.1.0$^{2,6}$]dec - 3 - en - 8-yloxy)ethoxy)-5(2-(4-oxatetracyclo[6.2.1.0$^{2,7}$.0$^{3,5}$]undec - 9 - yloxy)ethoxy) - 1, 4-dioxane by inspection of its infrared absorption spectrum and by analysis for oxirane oxygen.

*Example 7*

To a reaction vessel which contains 2,3-bis(tetracyclo [6.2.1.1$^{3,6}$.0$^{2,7}$]dodec-9-en-4-yloxy) - 1,4 - dioxane (0.500 mole) maintained about 40° C. with stirring, there is added, dropwise, 142 grams of a 25 weight percent solution of peracetic acid in ethyl acetate over a period of 2 hours. After an additional 2 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2-(tetracyclo[6.2.1.1$^{3,6}$.0$^{2,7}$]dodec-9-en-4-yloxy) - 3 - (5-oxapentacyclo[6.3.1.1$^{3,6}$.0$^{2,7}$.0$^{9,11}$]tridec-4-yloxy)-1,4-dioxane by inspection of its infrared absorption spectrum and by analysis for oxirane oxygen.

*Example 8*

To a reaction vessel which contains 2,3-bis(2-(tetracyclo[6.2.1.1$^{3,6}$.0$^{2,7}$]dodec - 9 - en - 4-yloxy)ethoxy)-1,4-dioxane (0.500 mole) maintained about 40° C. with stirring, there is added, dropwise, 142 grams of a 25 weight percent solution of peracetic acid in ethyl acetate over a period of 2 hours. After an additional 2 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2-(2-(tetracyclo[6.2.1.1$^{3,6}$.0$^{2,7}$] dodec - 9 - en - 4 - yloxy)ethoxy)-3-(2-(10-oxapentacyclo [6.3.1.1$^{3,6}$.0$^{2,7}$.0$^{9,11}$]tridec - 4 - yloxy)ethoxy)-1,4-dioxane by inspection of its infrared absorption spectrum and by analysis for oxirane oxygen.

*Example 9*

To a reaction vessel which contains 2,3-bis(tetracyclo [6.2.1.1$^{3,6}$.0$^{2,7}$]dodec - 9 - en - 4 - ylmethoxy)-1,4-dioxane (0.500 mole) maintained about 40° C. with stirring, there is added, dropwise, 142 grams of a 25 weight percent solution of peracetic acid in ethyl acetate over a period of 2 hours. After an additional 2 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2-(tetracyclo[6.2.1.1$^{3,6}$.0$^{2,7}$]dodec-9-en-ylmethoxy) - 3 - (10-oxapentacyclo[6.3.1.1$^{3,6}$.0$^{2,7}$.0$^{9,11}$]tridec-4-ylmethoxy-1,4-dioxane by inspection of its infrared absorption spectrum and by analysis for oxirane oxygen.

*Example 10*

To a reaction vessel which contains 2,3-diallyloxy-1,4-dioxane (0.500 mole) maintained about 50° C. with stirring, there is added, dropwise, 142 grams of a 25 weight percent solution of peracetic acid in ethyl acetate over a period of 2 hours. After an additional 3 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2-allyloxy-3-(2,3-epoxypropoxy)-1,4-dioxane, B.P. 115–125° C./0.25 mm., $n_D^{30}$=1.4608. The infrared absorption spectrum and oxirane oxygen analyses of the product were consistent with the assigned structure.

*Example 11*

To a reaction vessel which contains 2,3-di(2-butenyloxy)1,4-dioxane (0.500 mole) maintained about 40° C. with stirring, there is added, dropwise, 142 grams of a 25 weight percent solution of peracetic acid in ethyl acetate over a period of 2.5 hours. After an additional 3 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2-(2-butenyloxy)-3-(2,3-epoxybutoxy)-1,4-dioxane by inspection of its infrared absorption spectrum and by analysis for oxirane oxygen.

*Example 12*

To a reaction vessel which contains 2,3-di(2-methylallyloxy)-1,4-dioxane (0.500 mole) maintained about 40° C. with stirring, there is added, dropwise, 142 grams of a 25 weight percent solution of peracetic acid in ethyl acetate over a period of 3 hours. After an additional 2.5 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2-(2-methylallyl)-3-(2-methyl-2,3-epoxypropoxy)-1,4-dioxane by inspection of its infrared absorption spectrum and by analysis for oxirane oxygen.

*Example 13*

To a reaction vessel which contains 2,3-di(2-hexenyloxy)-1,4-dioxane (0.500 mole) maintained about 45° C. with stirring, there is added, dropwise, 142 grams of a 25 weight percent solution of peracetic acid in ethyl acetate over a period of 3 hours. After an additional 3 hours at about 45° C., the reaction is essentially complete as indicated by a titration for peracetic acid. The volatile material, i.e., ethyl acetate, acetic acid by-product, etc., are removed from the reaction product mixture by co-distillation with ethylbenzene. The viscous liquid product, thus obtained, is identified as 2-(2-hexenyloxy)-3-(2,3-epoxyhexoxy)-1,4-dioxane by inspection of its infrared absorption spectrum and by analysis for oxirane oxygen.

Reasonable variations and modifications of the invention can be made or carried out in the light of the above disclosure without departing from the spirit and scope thereof.

What is claimed is:

1. An ethylenically unsaturated monoepoxy dioxane of the formula:

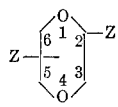

wherein the Z variables are of the group consisting of the following pairs:

(a) vic-epoxyalkoxy having up to 18 carbon atoms in which the vic-epoxy group is at least one carbon atom removed from the oxy group thereof, and alkenyloxy having up to 18 carbon atoms and in which the ethylenic group is at least one carbon atom removed from the oxy group thereof;

(b) vic-epoxycycloalkoxy having from 5 to 7 carbon atoms in the cycloaliphatic nucleus and in which the vic-epoxy group is at least one carbon atom removed from the oxy group thereof, and cycloalkenyloxy having from 5 to 7 carbon atoms in the cycloaliphatic nucleus and in which the ethylenic group is at least one carbon atom removed from the oxy group thereof;

(c) vic-epoxycycloalkylalkoxy having from 5 to 7 carbon atoms in the cycloalphatic nucleus and from 1 to 6 carbon atoms in the alkoxy moiety thereof, and cycloalkenylalkoxy having from 5 to 7 carbon atoms in the cycloaliphatic nucleus and from 1 to 6 carbon atoms in the alkoxy moiety thereof;

(d) 3-oxatricyclo[3.2.1.0$^{2,4}$]oct-6-oxy, and bicyclo[2.2.1]hept-2-en-5-oxy;

(e) 3-oxatricyclo[3.2.1.0$^{2,4}$]oct-6-ylalkoxy having from 1 to 6 carbon atoms in the alkoxy moiety thereof, and bicyclo[2.2.1]hept-2-en-5-ylalkoxy having from 1 to 6 carbon atoms in the alkoxy moiety thereof;

(f) 4-oxatetracyclo[6.2.1.0$^{2,7}$.0$^{3,5}$]undec-9-oxy, and tricyclo[5.2.1.0$^{2,6}$]dec-3-en-8-oxy;

(g) 4-oxatetracyclo[6.2.1.0$^{2,7}$.0$^{3,5}$]undec-9-oxyalkoxy having from 2 to 6 carbon atoms in the alkoxy moiety thereof, and tricyclo[5.2.1.0$^{2,6}$]dec-3-en-8-oxyalkoxy having from 2 to 6 carbon atoms in the alkoxy moiety thereof;

(h) 10-oxapentacyclo[6.3.1.1.$^{3,6}$.0$^{2,7}$.0$^{9,11}$]tridec-4-oxy, and tetracyclo[6.2.1.1.$^{3,6}$.0$^{2,7}$]dodec-9-en-4-oxy;

(i) 10-oxapentacyclo[6.3.1.1.$^{3,6}$.0$^{2,7}$.0$^{9,11}$]tridec-4-oxyalkoxy having from 2 to 6 carbon atoms in the alkoxy moiety thereof, and tetracyclo[6.2.1.1.$^{3,6}$.0$^{2,7}$]dodec-9-en-4-oxyalkoxy having from 2 to 6 carbon atoms in the alkoxy moiety thereof; and (j) 10-oxapentacyclo[6.3.1.1.$^{3,6}$.0$^{2,7}$.0$^{9,11}$]tridec-4-ylalkoxy having from 1 to 6 carbon atoms in the alkoxy moiety thereof, and tetracyclo[6.2.1.1.$^{3,6}$.0$^{2,7}$]dodec-9-en-4-ylalkoxy having from 1 to 6 carbon atoms in the alkoxy moiety thereof; with the proviso that the Z variables cannot be bonded to the carbon atom in the six position of the 1,4-dioxane nucleus.

2. 2-alkenyloxy-3(5)-vic-epoxyalkoxy-1,4-dioxane wherein the ethylenic group is at least one carbon atom removed from the oxy group of the alkenyloxy radical, wherein the vic-epoxy group is at least one carbon atom removed from the oxy group of the vic-epoxyalkoxy radical, and wherein the alkenyloxy and vic-epoxyalkoxy moieties each contain up to 18 carbon atoms.

3. 2-cycloalkenyloxy-3(5)-vic-epoxycycloalkoxy-1,4-dioxane wherein the ethylenic group is at least one carbon atom removed from the oxy group of the cycloalkenyloxy radical, wherein the vic-epoxy group is at least one carbon atom removed from the oxy group of the vic-epoxycycloalkoxy radical, and wherein the cycloaliphatic nuclei of the cycloalkenyloxy and vic-epoxycycloalkoxy moieties contain from 5 to 7 carbon atoms.

4. 2-cycloalkenylalkoxy-3(5)-vic-epoxycycloalkylalkoxy-1,4-dioxane wherein the cycloalkenyl and vic-epoxycycloalkyl moieties thereof contain from 5 to 7 carbon atoms in the cycloaliphatic nucleus, and wherein the alkoxy moieties thereof contain from 1 to 6 carbon atoms.

5. 2-(bicyclo[2.2.1]hept-2-en-5-oxy)-3-(3-oxatricyclo[3.2.1.0$^{2,4}$]oct-6-oxy)-1,4-dioxane.

6. 2-(bicyclo[2.2.1]hept-2-en-5-ylalkoxy)-3(5)-(3-oxatricyclo]3.2.1.0$^{2,4}$]oct-6-ylalkoxy)-1,4-dioxane wherein the alkoxy moiety thereof contains from 1 to 6 carbon atoms.

7. 2-(tricyclo[5.2.1.0$^{2,6}$]dec-3-en-8-oxy)-3-(4-oxatetracyclo[6.2.1.0$^{2,7}$.0$^{3,5}$]undec-9-oxy)-1,4-dioxane.

8. 2-(tricyclo[5.2.1.0$^{2,6}$]dec-3-en-8-oxyalkoxy)-3(5)-(4-oxatetracyclo[6.2.1.0$^{2,7}$.0$^{3,5}$]undec-9-oxyalkoxy-1,4-dioxane wherein the alkoxq moieties thereof contain from 2 to 6 carbon atoms.

9. 2-(tetracyclo[6.2.1.1$^{3,6}$.0$^{2,7}$]dodec-9-en-4-oxy)-3-(10-oxapentacyclo[6.3.1.1$^{3,6}$.0$^{2,7}$.0$^{9,11}$]tridec-4-oxy)-1,4-dioxane.

10. 2-(tetracyclo[6.2.1.1.$^{3,6}$.0$^{2,7}$]dodec-9-en-4-oxyalkoxy)-3(5)-(10-oxapentacyclo[6.3.1.1.$^{3,6}$.0$^{2,7}$.0$^{9,11}$]tridec-4-oxyalkoxy)-1,4-dioxane wherein the alkoxy moieties thereof contain from 2 to 6 carbon atoms.

11. 2-(tetracyclo[6.2.1.1$^{3,6}$.0$^{2,7}$]dodec-9-en-4-ylalkoxy)-3(5)-(10-oxapentacyclo[6.3.1.1$^{3,6}$.0$^{2,7}$.0$^{9,11}$]tridec-4-ylalkoxy)-1,4-dioxane wherein the alkoxy moieties thereof contain from 1 to 6 carbon atoms.

12. 2-allyloxy-3-(2,3-epoxypropoxy)-1,4-dioxane.

13. 2-(2-butenyloxy)-3-(2,3-epoxybutoxy)-1,4-dioxane.

14. 2-(2-methylallyloxy)-3-(2-methyl-2,3-epoxypropoxy)-1,4-dioxane.

15. 2-(3-cyclohexenyloxy)-3-(3,4-epoxycyclohexoxy)-1,4-dioxane.

References Cited by the Examiner

Bergmann: "The Chemistry of Acetylene and Related Compounds," p. 80 (1948).

Wheland: "Advanced Organic Chemistry," 2d Ed., p. 373 (1949).

WALTER A. MODANCE, *Primary Examiner.*

NICHOLAS S. RIZZO, *Examiner.*